United States Patent [19]

Papst

[11] 4,359,761

[45] Nov. 16, 1982

[54] ELECTRIC MOTOR WITH MULTIPLE SHAFTS

[75] Inventor: Georg Papst, St. Georgen, Fed. Rep. of Germany

[73] Assignee: Papst Motoren KG, St. Georgen, Fed. Rep. of Germany

[21] Appl. No.: 59,681

[22] Filed: Jul. 23, 1979

[30] Foreign Application Priority Data

Jul. 27, 1978 [CH] Switzerland .................. 8080/78
Sep. 21, 1978 [CH] Switzerland .................. 9857/78

[51] Int. Cl.³ .................. G11B 15/32; H02K 16/00
[52] U.S. Cl. .................. 360/96.3; 310/114
[58] Field of Search .................. 360/96.3, 96.1, 96.2, 360/96.4, 73, 71, 72.3; 310/114, 112; 242/197–204

[56] References Cited

U.S. PATENT DOCUMENTS

| | | | |
|---|---|---|---|
| 3,717,780 | 2/1973 | Hohne, Jr. et al. | 310/114 |
| 3,801,043 | 4/1974 | Jenkins | 360/96.3 |
| 3,888,403 | 6/1975 | Yoshida et al. | 310/114 |
| 3,934,841 | 1/1976 | Zuckschwert et al. | 360/96.3 |
| 4,098,474 | 7/1978 | Lehnert | 242/200 |

Primary Examiner—Alfred H. Eddleman
Attorney, Agent, or Firm—Michael J. Striker

[57] ABSTRACT

An electric motor is provided with a stator and at least two armatures. In order to obtain a well adjustable and mechanically stable drive module, the stator is designed as the base plate of a multiple-shaft driving means.

14 Claims, 11 Drawing Figures

ELECTRIC MOTOR WITH MULTIPLE SHAFTS

BACKGROUND OF THE INVENTION

The invention relates to an electric motor with one stator and at least two armatures.

Electric motors of this type have a very large air gap, so that the degree of efficiency is relatively low, and the stator, in the manner of stators of customary motors, will require special means for coupling the drives to the users driven by these, and also special provisions for their installation within the driven machine. Especially with mass-produced items, this will lead to relatively high expenditure for the assembly and for auxiliary means for the assembly. (German published patent application No. 27 40 117 corresponding to U.S. Pat. No. 4,092,569).

SUMMARY OF THE INVENTION

In order to reduce the expenditure for material and assembling, the stator is therefore, according to this invention, designed as the base plate of a multiple-shaft drive unit.

The advantage of this arrangement consists in allowing that now all auxiliary devices can be arranged for assembly on the base plate, that the base plate can be used as a structural element of the driven machine, and in the torsional rigidity allowing the maintenance of very precise dimensions. This torsional rigidity is given, without any further measures, by the necessity of having a stable base plate for reasons of magnetic properties, so that the former must consist of iron sections that are not too thin.

Arrangements according to this invention can be used with advantage everywhere where compact means of driving are required to have a high degree of accurate rotation, as in data processing technology and in electro-acoustical arrangements, in textile technology (texturizing spindles) and in drives of optical devices such as, for instance, film cameras. They are of advantage especially when all drives, drive auxiliaries and the mechanically moved components of the respective driven apparatus are all arranged on the driving means. The resulting module is distinguished by high mechanical stability, allowing very precise adjustment of the tape guiding and which will also maintain this adjustment. Furthermore, in case of need, the entire module may easily be replaced, wherein the new module may already be pre-adjusted.

Such a module is particularly desirable with sound-cassette equipment, because with such equipment a very stable tape guiding can in most cases not be built due to high cost.

The arrangement however, has not only mechanical advantages. The iron cross-section may be reduced, particularly when the base plate for every armature has been magnetically optimized. Thus, for instance, the magnetic fluxes of two arnatures may be conducted in opposite directions, by inserting the permanent magnets or coils in such a manner, or by placing them in the circuit in such a manner, that locally the fluxes will cancel out each other. At such locations, the cross section of the iron my drastically be reduced, especially when the pole centers are additionally or independently localized thereat.

It is, however, also possible to arrange the frequencies or phases in alternating fields just so that no reverse magnetization will occur within the individual magnetic paths, thus bringing about a reduction of losses.

Construction of a base plate according to this invention is facilitated by assembling it of steel sheets. Thus, this component may be fabricated with the usual stamping tools. This is anyway the case when alternating voltages are applied, but is also of advantage with direct current drives.

In a further development of the invention, the base plate is made in one piece from a material with magnetic conductivity. The times required for assembly may thus be shortened.

Good magnetic properties are achieved by magnetic sintered metals or by ceramic materials.

In instances where relatively large air gaps are permitted, the base plate may consist of a plastic material containing magnetically conductive particles. The customary methods for the production of plastic shapes may be applied with such materials and will thus lead to inexpensive base plates. The field magnets may be inserted herein later on, if provision has been made for recesses in the base plate that will accommodate the permanent magnets. The permanent magnets may, however, also be cast into the plate.

Arrangements according to this invention may also be further improved upon and simplified, if a one-piece bridge is provided for the accommodation of the armature bearings.

Thus, for instance, arrangements may be made in the one-piece bridge, to accommodate bearings for a one-ended suspension of the armatures, whereby a very high degree of parallelism may be maintained with very small tolerances, the parallelism not undergoing any change after the completion of the bridge. By this, drive mechanisms for tape recorders may, for instance, be produced, which will comply with the high demands for parallelism of such devices without any noticeable increase in the manufacturing expenditure. Adjusting of the parallelism may be dispensed with herein.

It may also be of advantage if the base plate is cast into the bridge.

This measure will bring about a noticeable increase in strength, especially in base plates made of metallic sheets. On one hand, the pack of sheets is held together very firmly, and on the other hand, the high strength of the base plate thus achieved, will improve the strength of the bridge carrying the bearings, so that—even with thin packs of sheets—a stable drive module, maintaining its degree of parallelism, will result.

When using metallic castings it is appropriate that the portion of the bridge enclosing the base plate will have a cast thickness of a minimum of 1% of the largest dimension of the base plate, this in order to translate the required stress, exerted upon shrinking after casting, onto the cast-in base plate.

Dowels, bores and tracks for the accommodation of mechanically moved parts may be provided at the bridge as further additions.

These auxiliary means are especially required in the application as drive module in cassette devices, in order to retain pressure springs for the centering of cassettes, actuating auxiliaries such as, for instance, attenuators for the cassette cover (soft ejection) or cassette latches. Assembly legs, that may serve on servicing such a module to allow working at both sides, may easily be cast integral with the module. Such assembly legs may also be designed to serve as protective brackets for sensitive elements projecting from the module, such as, for instance, electric contacts.

It will also be of advantage if the power supply of the module which, in most instances, will be electronically controlled, is accommodated on a circuit board fastened to means of fastening on the bridge of the base plate. The user needs then to connect two wires only, instead of the ten or twenty lines otherwise required.

A further simplification may be achieved when the base plate and the bridge are of integral construction. Especially in cases where the costs for molds are high but the demands as to magnetism are not very high, the base plate and bridge may be of integral construction. Herein, the zones of varying magnetic properties—the bearing bridge, the magnetic conductors, possibly required permanent magnets—may be formed by suitable arrangement of particles with selected magnetic properties. At location, that is where forces of permanent magnetism are required, steel particles are used, soft-iron particles for the conductor pieces, and other fillers of non-magnetic type are used in the components constituting the bridge. The various types of particles are bonded by the plastic forming the connection.

Especially in the latter development of the invention, the bearings and means of fastening of the base plate may be integrated into the injection molding, so that an individual bearing bridge is obviated. Herein, adjustment of the individual bearings is effected, as in the arrangement already proposed, prior to casting, so that adjustment of the axes cannot be altered later on. By this, the entire module becomes a component of very high functional precision.

As is the case with sheet metal or sintered metal base plates, iron-free armatures may also be used with injection-molded drive modules, their low momentum of inertia making them suitable for data-processing equipment.

With the casting and injection molding methods as applied, it will be particularly simple to provide, apart from the recesses for a first actuating magnet, recesses for additional electrical actuating magnets. This will allow accommodation, within the drive module, of further actuating functions for remote control and also of magnets for cueing-in and of brake magnets, wherein further magnetic components on the equipment chassis may be dispensed with and wherein, arranging the respective poles corresponding to the design, favorable magnetizations are possible. Recesses may also be provided that may be utilized by the equipment manufacturer only in case of a later expansion of the drive module.

It can be seen from the above descriptions, that with arrangements according to this invention, nearly any combination desired may be used, tape-winding with capstan motors, indirect, i.e. belt-driving motors and actuating magnets, without causing a material increase in the price, or a deterioration of the drive module.

The arrangements may not only be used as tape recorder drives, but may also be applied, for instance, in data processing. There too, the demand exists for compact modules with a high parallelism of the drive shafts, and of simple manufacture.

Cassette drives use two tape-winding and one capstan drives. It is therefore of advantage when the base plate is provided for the accomodation of three armatures.

In case that a very high degree of synchronism must be obtained, the base plate may be provided for accommodation of four armatures. It will then be possible to maintain very precisely the synchronism and also the tape tensioning by using two controlled capstan motors. Such bi-directional double capstans are used with cassette equipment of very high quality.

The base plate may furthermore accommodate with advantage the recesses for the coil of a lifting magnet. Such an actuating magnet is mostly provided with high-quality tape and cassette equipment and will thus not require its own stator. In the drawing as described below, further details of the invention are schematically depicted.

DESCRIPTION OF THE PREFERRED EMBODIMENTS

Figure 1:
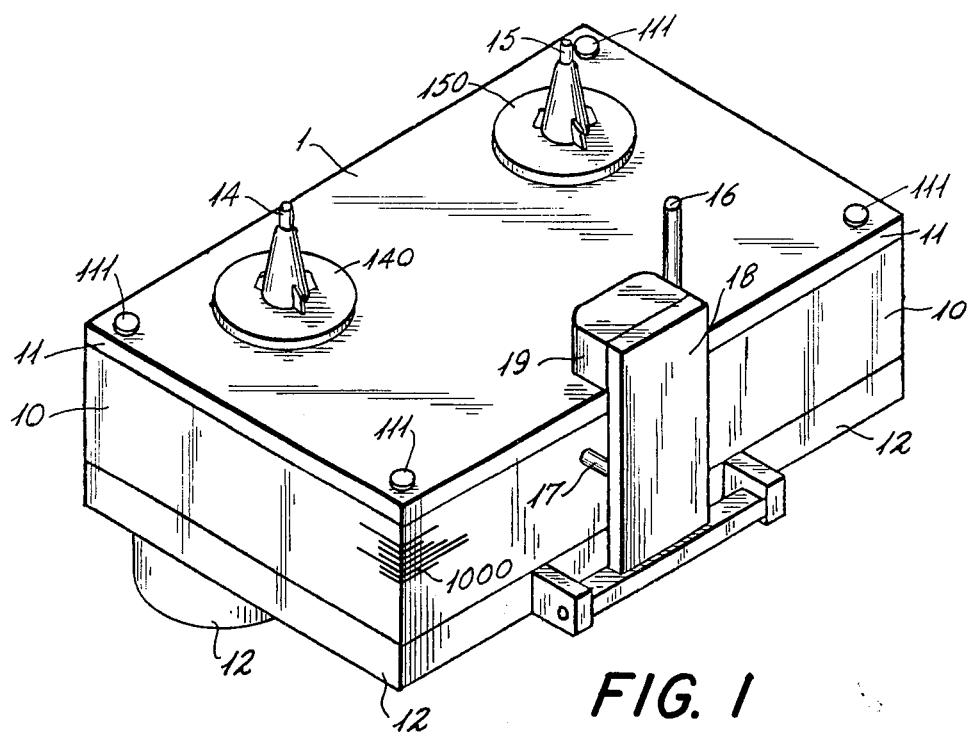
FIG. 1 is a perspective view of a base plate.
Figure 2:
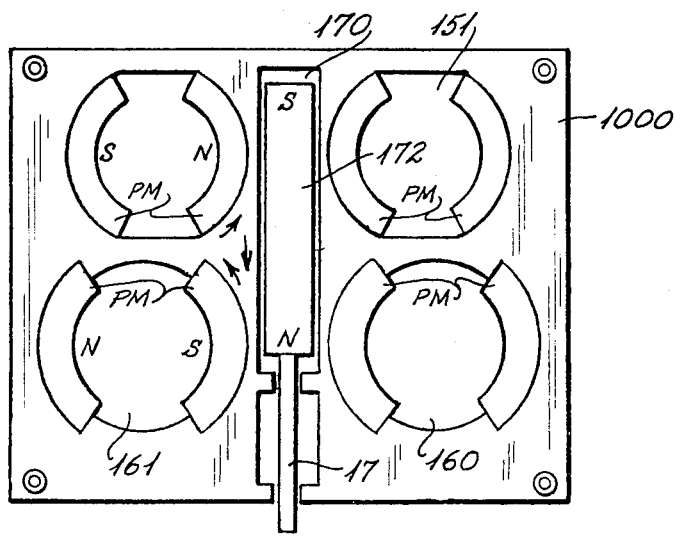
FIG. 2 is a top view of the base plate.

In FIG. 1, reference numeral 10 represents a base plate, assembled from metallic sheets of a section as shown in FIG. 2. The base plate 10 is held together by fastening means 111, fastening to a unit the individual sheets 1000 as well as the bearing bridges 11 and 12. This results in a mechanically very stable base plate which, as shown in the example described, may for instance be used as drive module 1 for a tape-cassette recorder. For this purpose, the armatures 14, 15, and 16 are provided which, together with the base plate 10 into which permanent magnets are inserted, will form three motors. The lower bearings of the motors 14, 15, and 16 are arranged in the lower bearing bridge 12. If the bearings are of a sufficient axial extent (collar bearings), then there is no need for upper bearings. Upper bearings may, however, also be inserted into the upper bearing bridge 11 if it should so be required. The collar bearings may however, also be inserted into the upper bearing bridge, if this should be of advantage by reasons of design or physical circumstances. Winding capstans 140, 150, are set upon the armatures 14,15, extending into the take-up holes of the tape cassette. The shaft of the motor 16 serves as capstan shaft for the recording tape. A lifting magnet with its armature 17, set into the base plate 10, will actuate the speaker head 19 which is mounted on a lever 18, bringing it into or out of engagement with the recording tape of the cassette, not shown here, which is placed onto the capstans 140, 150. The entire drive module is a component of extraordinary torsional rigidity which can without hesitation be installed in a chassis of much lighter construction, without any changes occurring in the adjustments, the spacings or the tape guiding.

Recesses 141, 151, 161 and 160 are arranged in the top surface of the base plate 10 of FIG. 2, which can accommodate the armatures 14, 15, 16 and an additional armature. A recess 170 is furthermore provided, which can accommodate a lifting magnet 172 with its armature 17. Permanent magnets PM are inserted into the recesses 141, 151, 161, 160, the former generating the stator field for the armatures 14, 15, 16, and so on. If alternating current motors are to be used, alternating-field coils may also be inserted.

FIG. 2 shows such a section through a base plate for the accommodation of four motors. A section of this type is of advantage, inasmuch as it is symmetrical and mistakes can therefore not occur. If, however, weight is to be saved, a base plate with four recesses may be used even if only three armatures are installed. Base plates four four motors may be used with cassette tape equipment in order to provide for two controlled capstan drives by means of which, using interlocking controls, tape tensioning may, for instance, be kept constant with a high degree of accuracy.

The arrows M indicate the directions of magnetic flux which, as shown in FIG. 2, may be conducted in opposite directions. This will allow using very thin iron cross sections, without saturation losses.

A further advantage results from the fact that with, for instance, cassette tape recorders, the lifting magnet 172 and the two winding motors 14, 15, will not simultaneously be operated at full load, and that, when operating the lifting magnet, only the capstan drive 16 will be running under full load. In arrangements with alternating current, the magnetic flux of every motor may be so conducted that it will add itself to the others, but a phase shift of 180° will act to prevent reverse magnetization. Such operation, too, will bring about a reduction of iron losses, an advantage resulting from a common stator for several motors.

Figure 3:
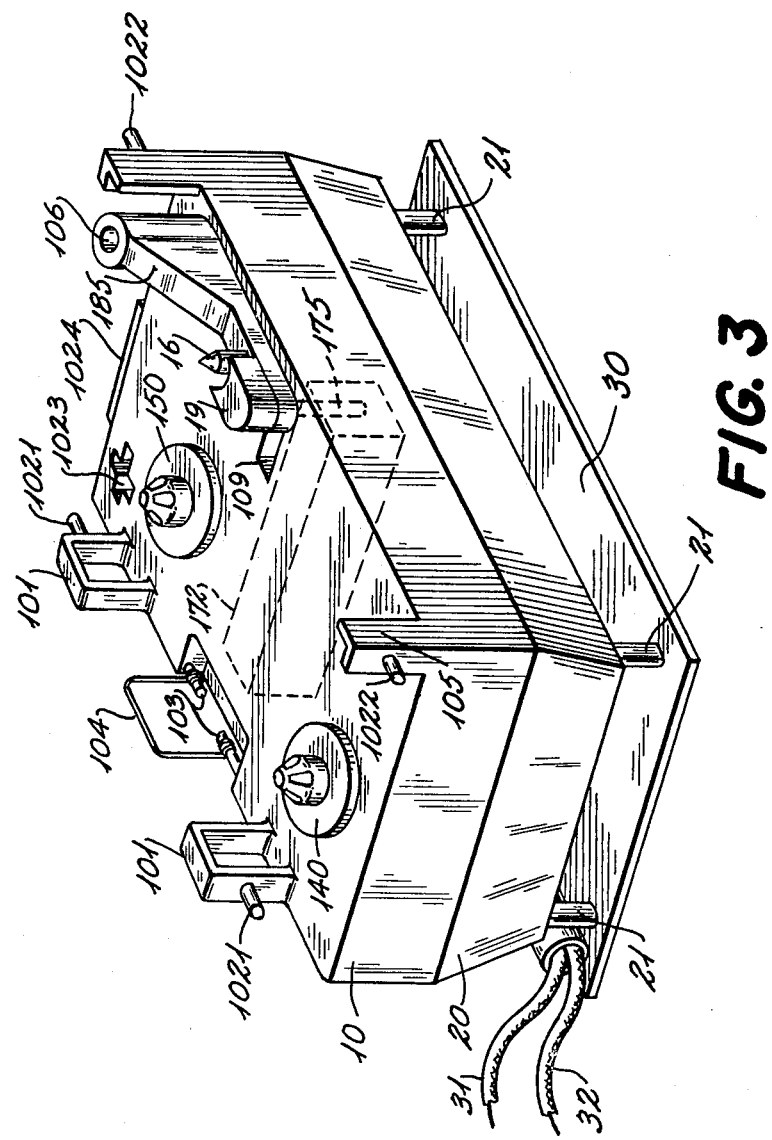
FIG. 3 is a perspective view of a modified base plate.

In FIG. 3, reference numeral 10 denotes a bridge into which a base plate has been cast. A second bridge 20, connected with the first bridge 10, holds the bearings for the winding motors 140 and 150, and for the tape motor with the tape spindle 16. The retainers 101 and 105, forming a stable unit with the shaft 106, are integrally cast on to provide a support surface if installations are to be made at the bottom side of the module. These retainers are also provided with eyes 1021 into which the cassette cover can be hinged when top loading of the unit is intended, otherwise, eyes 1022 are provided for front loading.

Eyes 103 retain a bracket spring 104 serving to center the cassette in front of the recording head 19. The recording head 19 can be moved on an arm 185, the latter being supported with its axle 106 by the bridge 10, actuation of the arm ensuing by the actuating magnet 172 via a pin 175 which can be moved within the slot 109. A control board 30, containing the entire controls for all drives of the module is connected to the module by means of fasteners 21. Thus, the user of the drive module will have to connect only the supply line 31 and the operating control line 32 with the remainder of the apparatus.

Apart from the eyes 1021, 1022, additional recesses 1023 are provided—for an attenuator of the cassette cover—and guide tracks 1024 to guide a cassette latch.

Various examples of possible arrangements of the individual elements on a base plate are schematically illustrated in FIGS. 4 to 11.

In all FIGURES, reference numeral 1001 denotes a base plate, for instance a finished casting containing all bearing locations (which, however, might also have been fabricated for the same configuration from metallic sheets with a separate bearing bridge), into which the following individual elements may be inserted:

Winding motor 1500,
Capstan drive 160,
second Capstan drive 161
winding motor
second winding motor 151
recording head operating magnet 170
cueing magnet 180
second recording head operating magnet 190 brake magnet 200
motor for indirect drive 1502 and
ejector magnet 201

Figure 4:
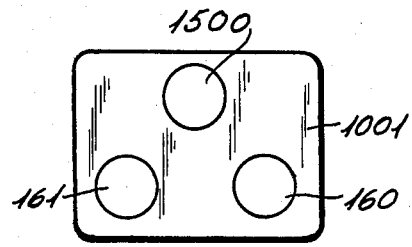
FIGS. 4–11 are schematic top views of further embodiments of the invention.
Figure 5:
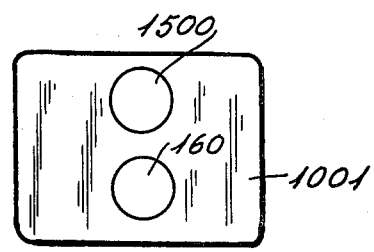
Figure 6:
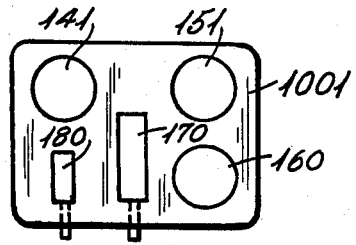
Figure 7:
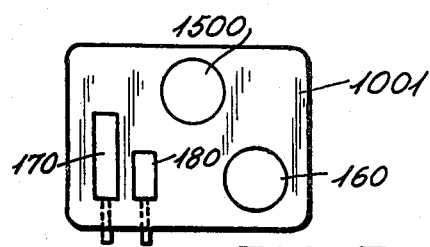
Figure 8:
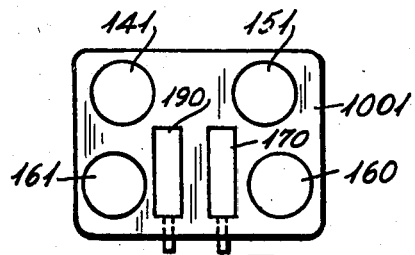

FIG. 4 shows an arrangement with an indirectly driving winding motor 1500 and two direct capstan drives 160 and 161;

FIG. 5 an arrangement with an indirectly driving winding motor 1500 and an indirect capstan drive 160;

FIG. 6 an arrangement with two directt-driving winding motors 141 with parallel axes, an indirect capstan drive 160, a centrally located operating magnet 170 preferably in symmetrical arrangement relative to the inserted cassette, and a cueing magnet 180;

FIG. 7 an arrangement with an indirectly driving winding motor 1500, a direct capstan drive 160, a recording head operating magnet 170 and a cueing magnet 180;

FIG. 8 is an arrangement with two tape winding motors 141, 151 with parallel axes, two direct-drive capstan motors 160, 161 for automatic-reversing control, and two operating magnets 170, 190.

Figure 9:
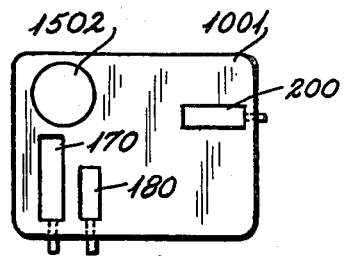

FIG. 9 is an arrangement with an indirect drive 1502 for the tape capstan, serving simultaneously also as winding motor, a brake magnet 200, a cueing magnet 180 and a recording head operating magnet 170.

Figure 10:
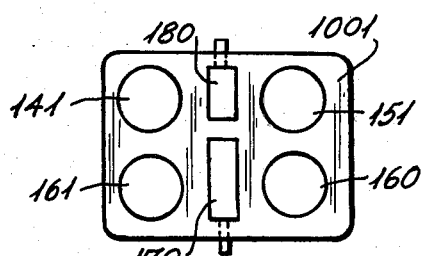

FIG. 10 shows a particularly advantageous embodiment with each two directly-driving winding and capstan motors 141, 151 and 160, 161 respectively, a recording head operating magnet 170 and a cueing magnet 180, the magnets on their part being symmetrically arranged on the axis of symmetry of the four motors.

Figure 11:
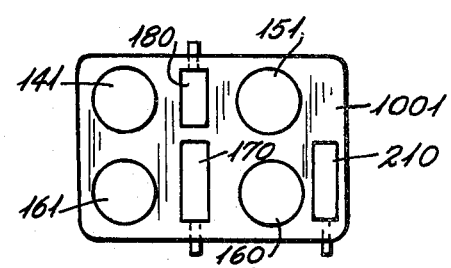

FIG. 11 shows the same arrangement as FIG. 10, but with an additional ejector magnet. This allows remote control of the cassette loader as, for instance, required in language-teaching installations.

It will be understood that each of the elements described above, or two or more together, may also find a useful application in other types of constructions differing from the types described above.

What is claimed as new and desired to be protected by Letters Patent is set forth in the appended claims:

1. A multiple shaft driving apparatus comprising a single base plate formed with a plurality of recesses opening into a major surface of the plate; said plate being of a magnetic material; a plurality of electric motors having the shafts of their armatures arranged for rotation in respective recesses; and the stators of said motors being formed by the walls of said recesses and being magnetically interconnected by said plate.

2. The apparatus as defined in claim 1 wherein said shafts and said major surface of said base plate support respectively, movable component parts of a magnetic tape recorder.

3. The apparatus as defined in claim 2 wherein a pair of said shaft drives a cassette of a cassette-type recorder.

4. The apparatus as defined in claim 1 wherein said stators further include means for adjusting magnetic field in said base plate.

5. The apparatus as defined in claim 4 wherein said means are permanent magnets for adjusting magnetic fluxes in respective stators in opposite directions.

6. The apparatus as defined in claim 4 wherein said means are coils operable for adjusting magnetic fluxes in a time sequence.

7. The apparatus as defined in claim 1 wherein said base plate is assembled of ferromagnetic sheets.

8. The apparatus as defined in claim 1 wherein said base plate is made of a one-piece ferromagnetic metal.

9. The apparatus as defined in claim 30 wherein said one-piece metal is a sintered metal material.

10. The apparatus as defined in claim 1 wherein said base plate is made of a synthetic material containing magnetically conductive particles.

11. The apparatus as defined in claim 1 wherein said stators include permanent magnets recessed in the walls of said recesses.

12. The apparatus as defined in claim 1 wherein said base plate includes a one-piece cover plate arranged on said major surface and supporting for rotation said rotors.

13. The apparatus as defined in claim 12 further including a control panel arranged at the opposite major surface of said base plate.

14. The apparatus as defined in claim 12 wherein said base plate and said cover plate are integrally connected.

* * * * *